United States Patent
Hsu et al.

(10) Patent No.: US 9,417,841 B2
(45) Date of Patent: Aug. 16, 2016

(54) RECONFIGURABLE SORTER AND METHOD OF SORTING

(71) Applicant: NATIONAL CHIAO TUNG UNIVERSITY, Hsinchu (TW)

(72) Inventors: Terng-Yin Hsu, Hsinchu (TW); Wei-Chi Lai, Hsinchu (TW); Ying-Liang Chen, Hsinchu (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 448 days.

(21) Appl. No.: 13/952,717

(22) Filed: Jul. 29, 2013

(65) Prior Publication Data

US 2014/0379735 A1 Dec. 25, 2014

(30) Foreign Application Priority Data

Jun. 19, 2013 (TW) .............................. 102121746 A

(51) Int. Cl.
*G06F 17/50* (2006.01)
*G06F 7/24* (2006.01)

(52) U.S. Cl.
CPC ....................... *G06F 7/24* (2013.01)

(58) Field of Classification Search
USPC ........................................................ 716/117
See application file for complete search history.

(56) References Cited

U.S. PATENT DOCUMENTS

| | | | | |
|---|---|---|---|---|
| 5,216,420 A | * | 6/1993 | Munter | ..................... G06F 7/24 340/14.1 |
| 5,440,736 A | | 8/1995 | Lawson et al. | |
| 5,535,384 A | | 7/1996 | Kasahara | |
| 5,542,091 A | * | 7/1996 | Yagasaki | ................... G06F 7/24 |
| 2009/0259822 A1 | * | 10/2009 | Platt | .................... H04N 21/434 712/4 |

FOREIGN PATENT DOCUMENTS

| | | |
|---|---|---|
| CN | 101261576 A | 9/2008 |
| EP | 0109426 B1 | 8/1989 |
| TW | 207013 | 6/1993 |
| TW | 200844846 | 11/2008 |

* cited by examiner

*Primary Examiner* — Bryce Aisaka

(74) *Attorney, Agent, or Firm* — Li & Cai Intellectual Property (USA) Office

(57) ABSTRACT

Disclosure is related to a reconfigurable sorter and a method of sorting using the sorter. The reconfigurable sorting method is adapted to the sorter essentially consisting of multiple serially-connected comparison units. The each comparison unit includes two registers. The sorter is particularly a reconfigurable device according to the number of sorted numerals. According to the exemplary embodiment, an input mode is initiated firstly. Initial values are set to the registers. The numerals are sequentially inputted to the registers. At the input mode, the values in the registers may be shifted if necessary and mutually compared in every comparison unit. The values in the registers of every comparison unit may be swapped based on the comparison. At output mode, the numerals are outputted sequentially. The values in the registers are shifted and swapped until all numerals are completely outputted. The output appears the sorted numerals with low timing latency.

7 Claims, 8 Drawing Sheets

RECONFIGURABLE SORTER AND METHOD OF SORTING

BACKGROUND

1. Technical Field

The present invention is generally related to a reconfigurable sorter with low timing latency; in particular to the sorting device with a plurality of serially-connected comparison units and method of sorting.

2. Description of Related Art

Sorter is one of the important tools for numerical computation operated in a processor no matter it is made by software or hardware. According to a rough investigation, the operations made by the sorter may be accounted for around a quarter of the computing resources, including time and memory. It is therefore an important issue that how to improve the sorting algorithm.

One of the prior arts may be referred to U.S. Pat. No. 5,440,736, filed on Nov. 24, 1993, which is directed to a sorter for records having different amounts of data. Before the operation of this sorter for processing the different amounts of data, the collection of records is required to be normalized. The data may be categorized into different subsets. The data in every subset is firstly sorted in parallel, and the data of sorted subsets are then merged after one more sorting. However, this approach may meet timing latency and require much complicated hardware while the data goes through the mentioned process of grouping, sorting, and a final sorting.

One further prior technology is such as U.S. Pat. No. 5,535,384, filed on Jun. 8, 1994, which discloses a method for controlling a hardware merge sorter. This sorter may handle a large amount of data. The sorter is associated with multiple processors, memories, and selectors. The sorting system may be able to handle the large amount of data by paralleling the pipeline merge sorting circuits.

Referring to the above-mentioned prior technologies, the conventional sorting tasks require much complex hardware design to reduce timing latency. That means the lesser complex hardware design may result in longer timing latency. Further, the conventional sorter has no re-configurability.

SUMMARY

For the requirement of reduction of timing latency when performing sorting, provided is a sorter that is re-configurable under a low-latency condition. The sorter is a hardware-based circuitry, which is applicable to all the needs of sorting in circuits.

According one embodiment of the present invention, a reconfigurable sorting method is disclosed. The method is applicable to a reconfigurable sorting device composed of a plurality of serially-connected comparison units. The every comparison unit includes two registers. The sorting device is reconfigurable for the need of sorting more than one set of numerals.

The sorting device is at an input mode in a first step. The initial values of the registers of the comparison units are set as a maximum or a minimum under this input mode. The maximum or minimum is set as the initial value according to an aim of sorting. For example, the sorted numerals will be output from small to large when the initial values of the registers are set as maximum; alternatively, the sorted numerals are output from large to small when the initials values of registers are the minimum value.

In the input mode, the numerals are sequentially inputted via an input end of the sorting device. The numerals are input from the first comparison unit since the plurality of serially-connected comparison units are included in the sorting device. The first input value via this input end may be buffered into a register of the first comparison unit. In the meantime, the original value stored in this register is shifted to the other register of the other comparison unit, for example the neighboring unit. The comparison unit compares the values to be buffered in the register when the every comparison unit receives the input or shifted value. The comparing result made by the every comparison unit decides the value to be buffered in the registers of the comparison unit. The originally-stored value in the every register of the sorting device renders the larger or smaller value stayed in the every register.

After that, the above steps are repeated unit all the values are completely inputted. The input values also undergo the necessary shifting or swapping operation that allows the registers of the comparison units in the sorting device to have the consistent values based on the same rule. The sorted values are then outputted under this input mode.

Next, the sorting device enters an output mode. In the process of outputting the values, the values in the registers are sequentially output via the output end. For example, the values are output from the first comparison unit sequentially. While the value is output from the register, the value buffered in the register of another comparison unit next to the first comparison unit is shifted to the register where the previously-buffered value is output. During the sorting operation, the every comparison unit performs comparison onto the values in its register while the register's value changes. At last, the sorting device is configured to sort the values, and the values are stayed in the every register based on the comparison result.

The above steps are repeatedly if necessary until all of the values are completely inputted to the sorting device.

In an exemplary example, all or part of the serially-connected comparison units constituting the reconfigurable sorting device may perform a specific sorting task. That means the sorting device may be reconfigured to be divided to several sorting groups according to the requirement. The every sorting group includes its individual input end and output end.

The plurality of numerals are input to the sorting device sequentially. In the input mode or output mode, a control unit of the sorting device is used to switch the mode while the numerals are completely inputted or outputted according to a timing signal. The switching between the input mode and the output mode renders the sorting operation without timing latency.

According to the physical design, the reconfigurable sorting device includes multiple serially-connected comparison units, and every comparison unit includes two registers in an exemplary embodiment. The control unit is electrically connected to the many comparison units. The control unit switches the comparison units of the sorting device to the input mode and the output mode. The control unit also controls the operations of the registers. The basic circuit of the comparison unit has a comparator used to perform numeral comparison, two multiplexers. According to the result made by the comparator, the value buffered in the every register of the comparison unit is decided.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

DESCRIPTION OF THE EXEMPLARY EMBODIMENTS

Figure 1:
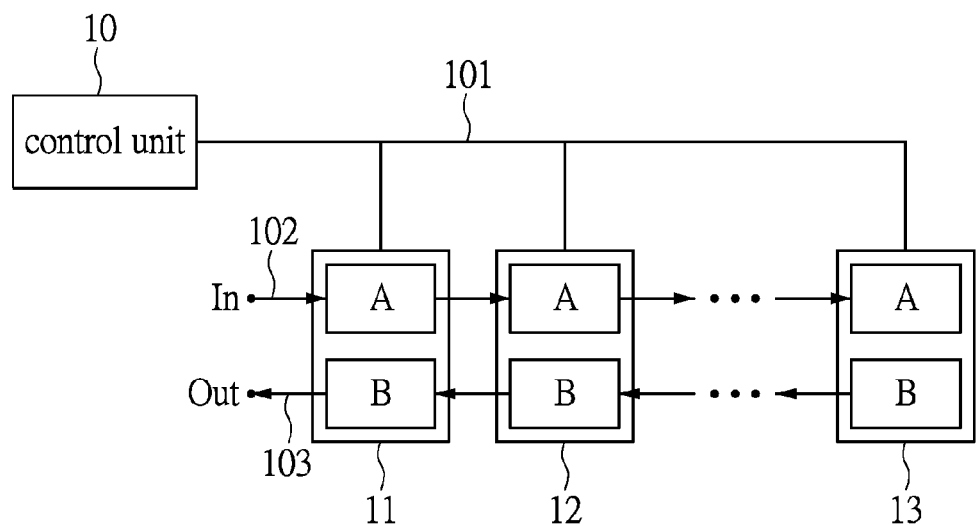
FIG. 1 shows a schematic diagram depicting a reconfigurable sorting device according to first embodiment of the present invention.

Reference will now be made in detail to the exemplary embodiments of the present disclosure, examples of which are illustrated in the accompanying drawings. Wherever possible, the same reference numbers are used in the drawings and the description to refer to the same or like parts.

Disclosure herein is related to a reconfigurable sorting device and a method for performing the sorting. The sorting method allows the sorting operation being made without timing latency, or low latency since the sorting device and the sorting process are provided. The sorting device is exemplarily a hardware-based circuitry that is applicable to the circuits requiring sorting operation. In addition to the sorting device capable reducing the timing latency, the sorting device is also reconfigurable.

First Embodiment

One of the embodiments is referred to FIG. 1 depicting the first type of the reconfigurable sorting device. The sorting device includes serially-connected comparison units 11, 12, 13. It is noted that the number of the comparison units is configured to comply with the sorting request. In particular, the comparison units of the sorting device are reconfigured to form one or more sorting groups if the number of the numerals is not as the all comparison units. The sorting operations made by the different sorting groups may be performed simultaneously or at different time.

Reference is made to FIG. 1. The every comparison units 11, 12, 13 includes two registers A, B. The first comparison unit 11 has an input end 102 and an output end 103 for the sorting device. The plurality of numerals to be sorted are inputted via this input end 102. The input numerals are firstly buffered to a buffer area A of this first comparison unit 11. The numerals are sequentially outputted via the output end 103 while the numerals are completely input.

Next, the sorting device is configured to have a control circuit, such as the shown control unit 10. The control unit 10 connects the comparison units 11, 12, 13 over a control line 101, and controls the comparison units 11, 12, 13 to be operated under the output mode or the input mode. The control unit 10 also controls access operations of the registers A, B, including erasing data, writing values of the registers A, B or the neighboring registers, and also provided for the external device' reading.

Figure 3:
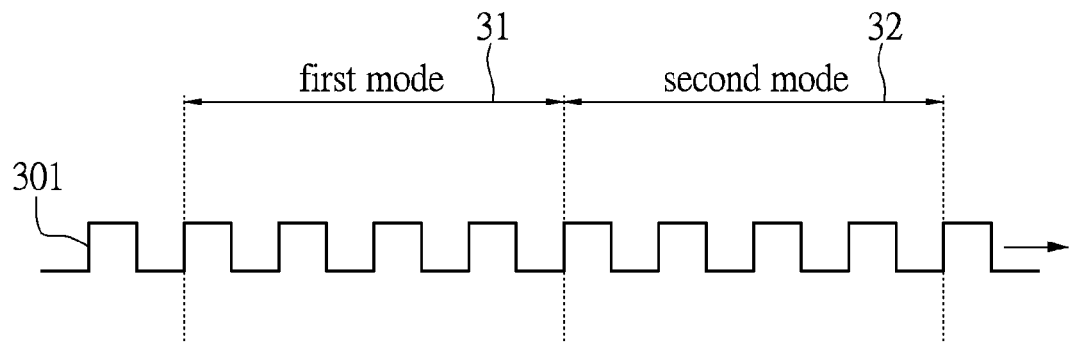
FIG. 3 schematically shows in/out timing chart of the sorting device in accordance with the present invention.

Reference is made to FIG. 3 depicting a timing diagram that the sorting device follows to perform data input and output. The diagram shows a square-formed timing 301 and the relationship of a first mode 31 and a second mode 32 of the sorting device based on the timing 301. The timing signals made by the control unit 10 or the device, under the first mode (the input mode), may be used to designate the timing to write the input values to registers of the sorting device. One the contrary, the second mode (the output mode) designates the timing to access the registers. As the example shown in the figure, the access operations with respect to switching the modes of the sorting device are based on the timing 301 when the values are inputted to or outputted from the sorting device sequentially. The sorting device in accordance with the present invention is featured to perform the sorting operations without timing latency.

Second Embodiment

Figure 2:
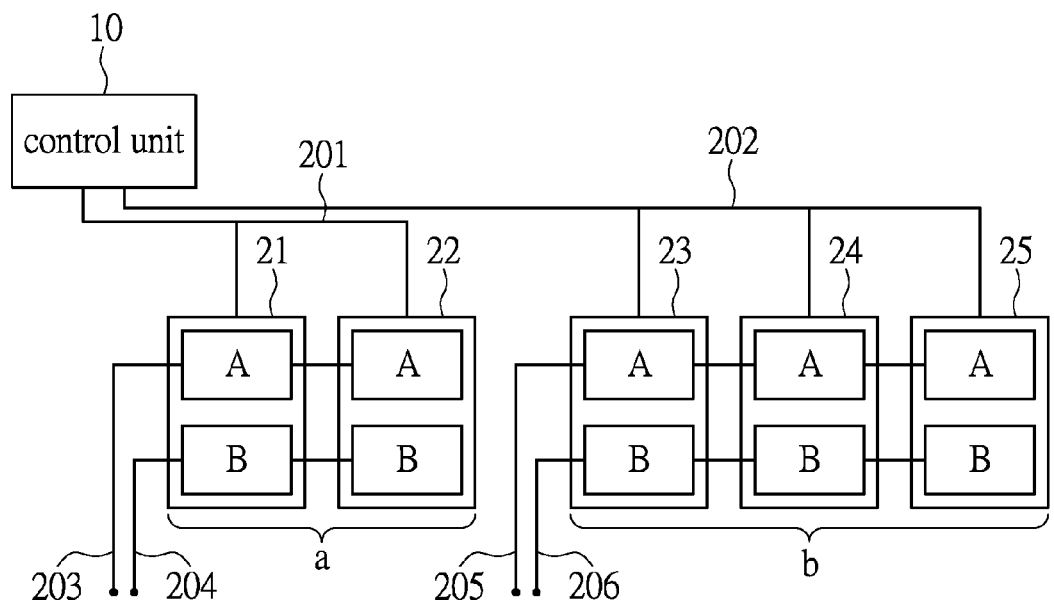
FIG. 2 shows one further schematic diagram depicting the reconfigurable sorting device according to second embodiment of the present invention.

The reconfigurable sorting device according to the embodiment is schematically shown in FIG. 2. The sorting device is reconfigurable according to the number of the numerals to be sorted. The sorting device is reconfigured to be divided into two or more sorting groups and the number of the comparison units for the every sorting group may be different.

A control unit 10 operates as a control circuit used to control the sorting device. In the present example, there are two control lines extended from the control unit 10. In which, a first control line 201 and a second control line 202 are respectively connected to two different sorting groups (first sorting group a, second sorting group b) that may be composed of different numbers of comparison units 21, 22, 23, 24, 25. The control unit 10 controls the input and output modes of the groups having the serially-connected comparison units (21, 22, 23, 24, 25). It is noted that diagrams are, but not limited to, schematically describing the reconfigurable sorting device of the present invention.

According to the present example, the shown first sorting group (a) includes the comparison units 21, 22. Every comparison unit (21, 22) has two registers A, B. The first sorting group (a) is configured to set up a first group input end 203 and a first group output end 204. The second sorting group (b) includes the comparison units 23, 24, 25 and has its second group input end 205 and a second group output end 206. These two sorting groups may simultaneously or at different time perform two different sorting operations. In the meantime, the two separate input ends (203, 205) are respectively performing inputting the different sets of numerals to be sorted.

FIG. 3 shows the timing diagram related to the sorting operation. The access operation made to the sorting device is in accordance with the timing signals under an input mode and an output mode (31, 32). After completing inputting the numerals under the input mode (first mode 31), the operation is then switched to the output mode (the second mode 32) at the next timing cycle. The sorting operation is therefore processed without timing latency.

Figure 4:
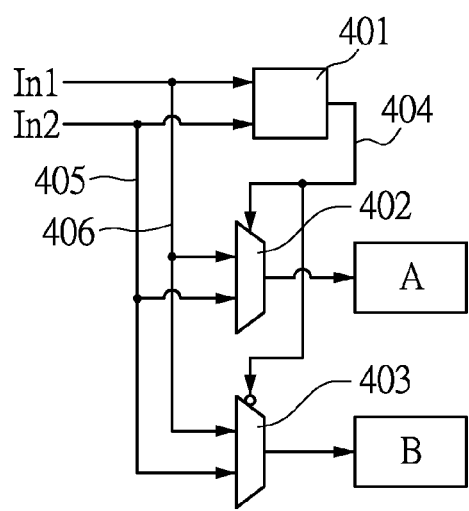
FIG. 4 shows a diagram depicting the circuit implementing the comparison unit in one embodiment of the present invention.

FIG. 4 next shows a schematic diagram of the circuit of the comparison unit in one embodiment of the present invention.

The two registers A, B in the every comparison unit are respectively connected to the two multiplexers such as the shown first multiplexer 402 and a second multiplexer 403. The comparison circuit is shown is the comparator 401. While two numerals such as the first numeral In1 and the second numeral In2 are inputted to the comparator 401, the comparator 401 performs numerical comparison. In accordance with the requirement of sorting for the whole system, the control circuit may be configured to decide the larger or smaller values are in the registers A, B.

While the first numeral In1 and the second numeral In2 are input into the comparator 401, the numerals are directed to the register A or register B switched by the first multiplexer 402 and the second multiplexer 403 over the comparison signal line 404 according to the comparison result. The multiplexers 402, 403 determine the values into the registers A and B according to the comparison result made by the comparator 401. That means the routes for the first numeral In1 and the second numeral In2 to the registers A and B over the lines 405 and 406 are determined.

[Input Mode]

Figure 5:
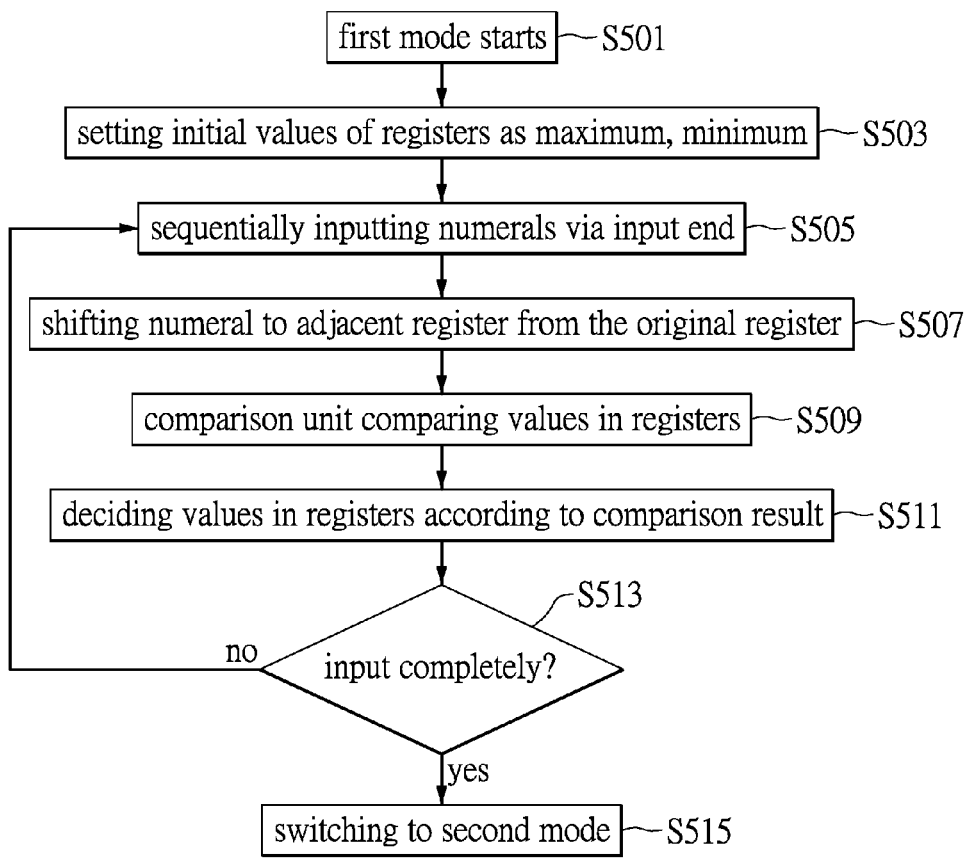
FIG. 5 shows a flow chart illustrating method for sorting in one embodiment of the present invention.

Reference is made to FIG. 5 describing the method for sorting under a first mode according to one of the embodiments of the invention.

In the beginning, such as step S501, the control unit initiates the comparison units entering a first mode. Next, in step S503, the initial values of the registers of the comparison units that join the current sorting task are configured to be a maximum or a minimum. The configuration to be the maximum or minimum is based on the requirement for the sorting task. For example, if it requires that the unsorted numerals inputted to the sorting device are sequentially outputted from small to large. In the meantime, the initial values of the registers for this sorting operation are set as maximum.

Figure 7:
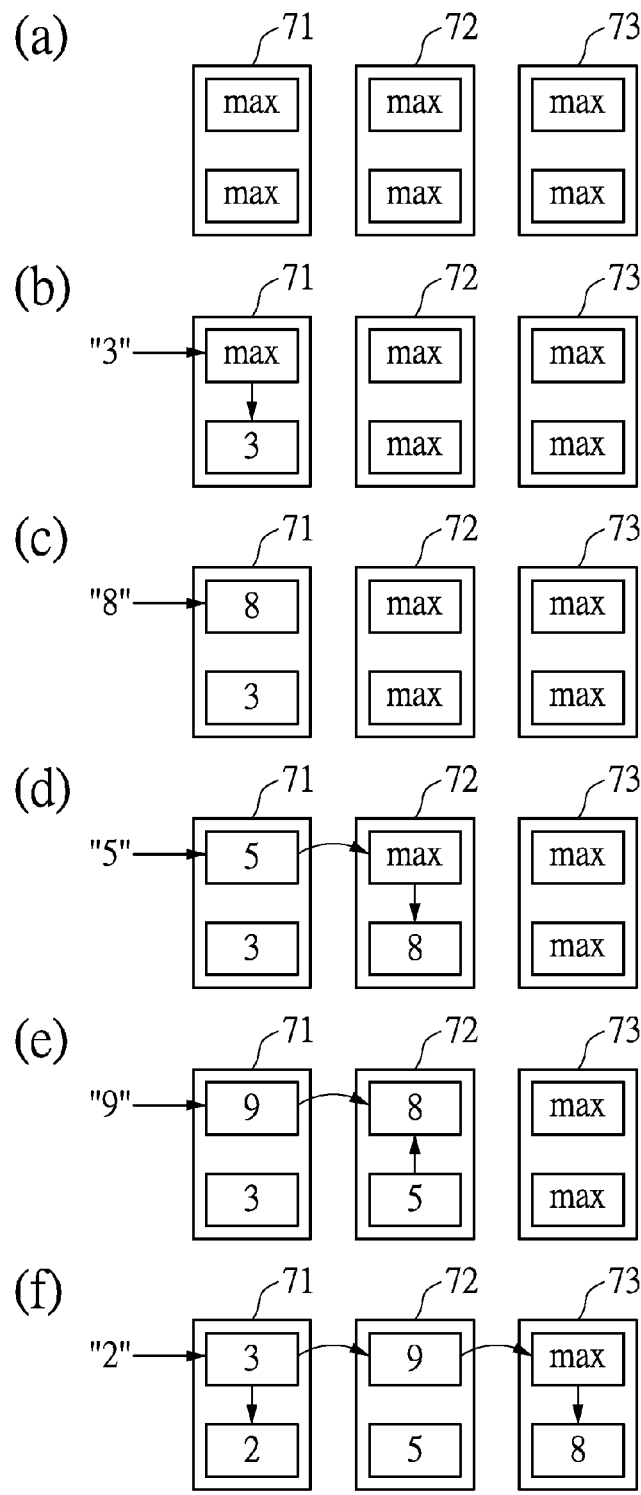
FIG. 7 schematically shows one embodiment performing the sorting in accordance with the present invention.
Figure 8:
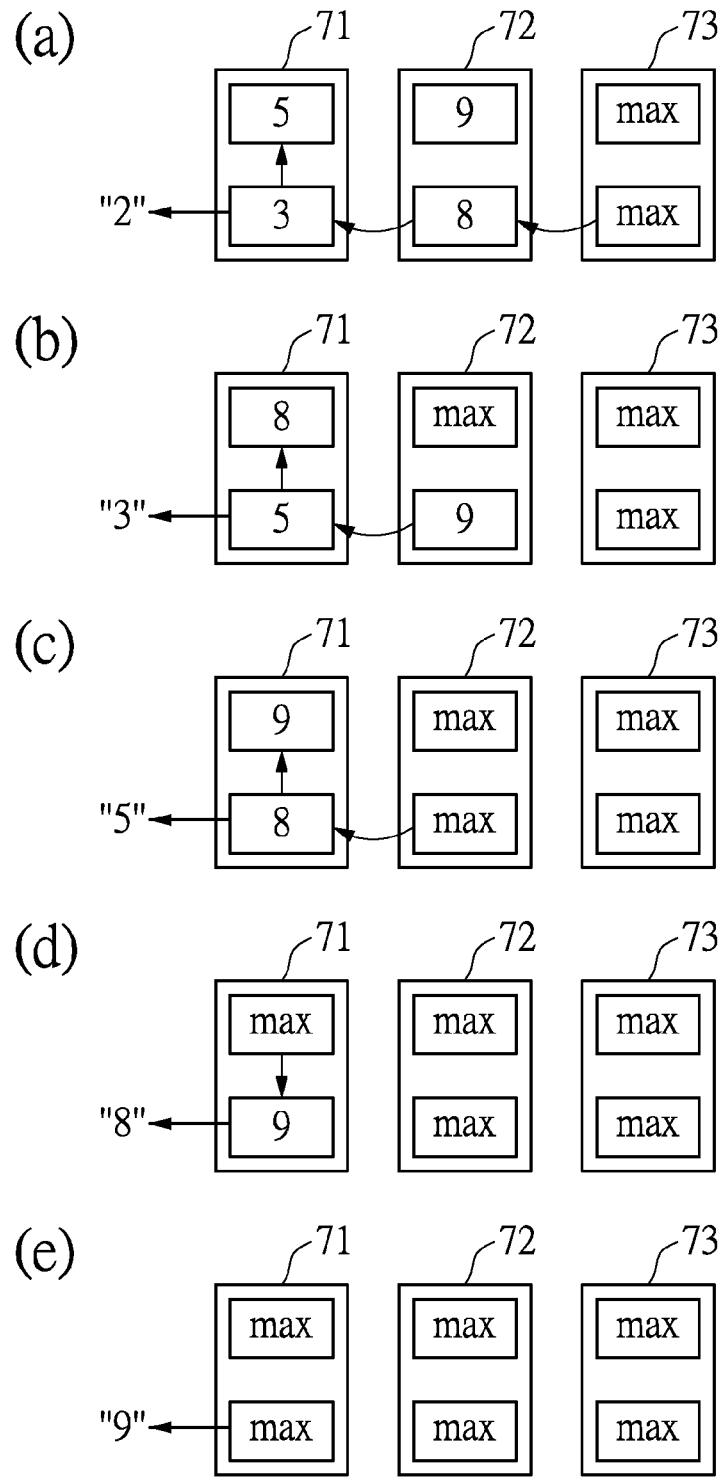
FIG. 8 schematically shows one further embodiment performing the sorting in accordance with the present invention.

By this scheme using the maximum as the initial value of the registers, the larger values are shifted to the later comparison unit(s) when the comparison unit compares the input numerals. Meanwhile the smaller numerals can be kept in the registers of the comparison unit(s) close to the input end. Consequently, the numerals to be sorted can be outputted from small to larger. In the procedure of the output mode, the every comparison unit performs comparison as the value of its any register changes. The related examples are depicted in FIG. 7 and FIG. 8.

On the other hand, the initial values of the registers are set as minimum when the sorting device is required to perform the sorting from large to small. While performing the comparison in the input procedure, the smaller numeral is shifted to the register of the comparison unit farther from the output end (input end). Then the larger numerals can be kept in the comparison unit close to the output end. This scheme therefore achieves outputting the larger numerals for the purpose of outputting the values from large to small.

After setting up the initial value for the registers, such as step S505, the numerals are inputted via the input end of the sorting device sequentially. At the moment that the first numeral is inputted, such as step S507, the input value may make the original value in the register shifting to the register of another comparison unit. The register is generally the adjacent register. In the example depicted in FIG. 7, the shift operation is to move the value to the adjacent register over a transverse direction.

Next, in step S509, the numerals in the comparison unit(s) are compared after the shifting operation. That means the comparison in the every comparison unit is performed while the value in the register is changed. In step S511, the comparison result decides the values in the registers. For example, the comparison result makes the larger value buffered in one register while the smaller one is in the other register.

In step S513, it is determined that whether or not the all numerals are inputted. If it is still in input mode (no), the operations of shifting, comparison and determining the state of registers are still performed while the process goes back to step S505 until the input mode ends (yes). The process is switched to output mode in step S515 when all the numerals are completely inputted (yes).

[Output Mode]

Figure 6:
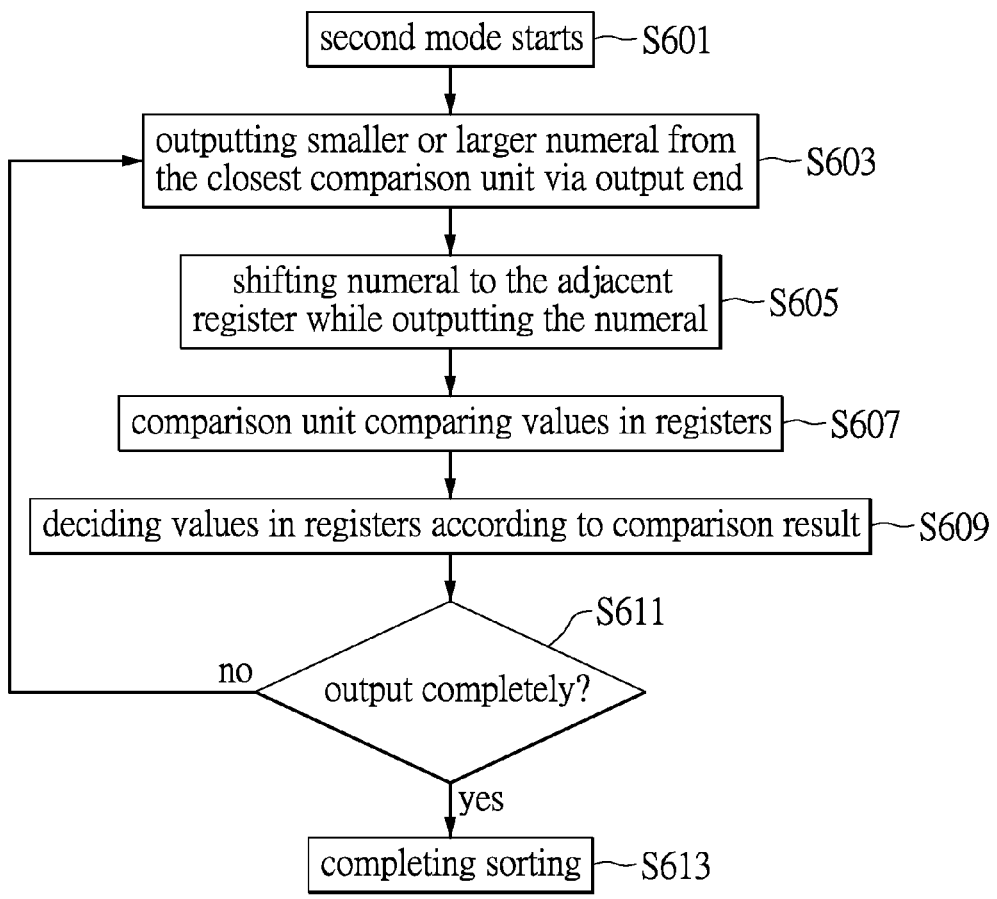
FIG. 6 shows a flow chart illustrating method for sorting in one further embodiment of the present invention.

The flow chart shown in FIG. 6 illustrates the method for sorting in the embodiment under a second mode. The control unit of the sorting device initiates the comparison units joining the sorting task (step S601) when the input mode ends.

In step S603, since all the input values are arranged into the registers under the input mode, the smaller or larger (based on the initial state) numeral is sequentially output from the comparison unit closest to the output end. For example, the comparison unit closest to the output end is regarded as a first comparison unit. The smallest numeral can be outputted from this first comparison unit for the purpose of outputting the values from small to large. All the numerals can be sequentially output from small to large.

In step S605, when the numeral in a register is outputted, the numeral buffered in the adjacent register is shifted to the register. FIG. 8 shows the example describing the shifting operation. The shifting operation is performed continuously onto all the registers next to the register where the buffered numeral is outputted. When every shifting operation performs, in step S607, the related comparison unit performs comparison onto the values in its registers as it acknowledges the value changes. In the meantime, in step S609, the comparison result results in the values in the registers. For example described in FIG. 7 or FIG. 8, the larger or smaller values are determined in the registers of the comparison unit according to the requirement.

In step S611, the control circuit determines if the full numerals are completely outputted. The process may go to the step S603 for repeating the above steps such as outputting, shifting, and swapping if the numerals are not completely outputted. The process performs the step S613 as the sorting is finished when the numerals are all outputted.

To the embodiments shown in FIG. 5 and FIG. 6, it is understood that the sorting task may be performed by all or a portion of the comparison units of the reconfigurable sorting device. Thus, before commencing entering the input mode of the sorting device such as S501 of FIG. 5, a sorting group may be set up for performing the sorting operation based on number of numerals to be sorted according to a sorting request. The sorting group includes a plurality of comparison units substantially due to the number. Every sorting group reconfigured by the sorting device includes one set of proprietary input end and output end.

Reference is made to FIG. 7 schematically depicting the sorting operation in one of the embodiments of the present invention. The present example shows five serially-connected comparison units performing sorting upon 5 numerals (3, 8, 5, 9, 2) from small to large.

FIG. 7(a) shows three comparison units indicative of a first comparison unit 71, a second comparison unit 72, and a third comparison unit 73. Every comparison unit has two registers for buffering data. To the sorting request of from small to large, the initial values of all registers of the comparison units are set as maximum. The maximum means it is larger than all the real numbers. According to the configuration of the every comparison unit of the present example, the larger value is buffered to the above register; and the input end for this sorting device is disposed to link to above contact of the first comparison unit 71.

Reference is next made to FIG. 7(b). In next timing cycle, a numeral "3" is inputted to the first comparison unit 71 via the input end. This first comparison unit 71 coupled to the input end is the first one of the comparison units. The register buffering the numeral "3" is initially at the above of first comparison unit 71. This input numeral "3" is then compared with the default maximum in the below register in the same comparison unit. This numeral "3" is swapped to the below register so as to keep the larger one in the above register because the comparison appears "3" is the smaller value.

FIG. 7(c) shows a second numeral "8" inputted to the sorting device at the next cycle via the input end. This second numeral "8" is firstly buffered to the above register of the first comparison unit 71. Meanwhile, the previous value "maximum" is shifted to the register at the same row of the next second comparison unit 72. At this moment, the two registers of the first comparison unit 71 respectively store the numerals "8" and "3". The larger "8" is at the above register after comparison.

FIG. 7(d) shows a second numeral "5" inputted to the upper register of the first comparison unit 71 at the next timing cycle. The previous numeral "8" in the register of the first comparison unit 71 is shifted to the adjacent second comparison unit 72. Then the numeral "8" in the second comparison unit 72 is compared with the maximum in the other register of the same comparison unit. The larger "maximum" is placed in the upper register, and the numeral "8" is in the lower register after comparison process. In the first comparison unit 71, the larger numeral "5" is placed in the upper register and the previously-inputted numeral "3" is in the below one.

FIG. 7(e) depicts the fourth numeral "9" is inputted to the first comparison unit 71 at the next timing cycle. The original numeral "5" is shifted to the second comparison unit 72 when the numeral "9" is inputted. The shifted numeral "5" is compared with the numeral "8" previously at the lower register of the second comparison unit 72. The larger numeral "8" is then swapped to upper register based on the comparison unit. At this moment, the input numeral "9" is compared with the numeral "3" previously buffered in the lower register of the first comparison unit 71. The larger numeral "9" stays in the upper register of the first comparison unit 71.

At the next timing cycle, referring to FIG. 7(f), the fifth numeral "2" is inputted. This numeral "2" is firstly buffered to the upper register of the first comparison unit 71. The original numeral "9" is shifted to the next comparison unit 72, and also the upper register at the same row. The numeral "8" previously kept in the upper register of the second comparison unit 72 is shifted to the register in the third comparison unit 73. The numeral "8" shifted to the third comparison unit 73 is compared with maximum value originally in the third comparison unit 73. The numeral "8" is the smaller, and swapped to the lower register of the third comparison unit 73. In the second comparison unit 72, the shifted-in numeral "9" is compared with the numeral "5" previously buffered in the lower register. The larger numeral "9" is kept in the upper register. On the other hand, in the first comparison unit 71, the input numeral "2" in the upper register is compared with the numeral "3" in the lower register. The larger numeral "3" is then placed in the upper register, and the numeral "2" is swapped to the lower register.

After the process shown in FIG. 7 under the input mode is finished, the adjacent registers at the same row of the comparison unit buffer the values with the similar attributes. For example, all the upper registers buffer larger values relative to the values in the lower registers. The values may not be swapped but sequentially placed when they are the same value.

FIG. 8 shows the flow illustrating the steps under the output mode of the sorting device, especially outputting the numerals from small to large.

To continue the step in FIG. 7(f), an output mode of the sorting device is initiated. An output end is connected to the below contact of the first comparison unit 71. It is noted that the smallest numeral "2" among the input numerals is buffered closest to the output end after the comparison process described in FIG. 7. It is also understood that the relatively smaller numerals are buffered in the lower registers of the comparison units; and on the other hand the upper registers of the comparison units buffer the larger numerals. FIG. 8(a) shows the numeral "2" in the lower register of the first comparison unit 71 is firstly outputted via the output end.

During the process at output stage, the numeral "5" buffered in the lower register of the second comparison unit 72 is shifted to the lower register of the first comparison unit 71 when the previous numeral "2" is outputted. The numeral "5" is compared with the numeral "3" in the upper register of the first comparison unit 71. The larger numeral "5" is swapped to the upper register, and the numeral "3" is outputted via the output end. The numeral "8" in the lower register of the third comparison unit 73 is also shifted to the register of the second comparison unit 72, and in the meantime compared with the numeral "9" previously in the second comparison unit 72. The larger numeral "9" is placed in the upper register of the second comparison unit 72.

At next timing cycle, such as shown in FIG. 8(b), the numeral "3" in the register closest to the output end is outputted via the output end. The numeral "8" in the lower register of the second comparison unit 72 is shifted to the lower register of the first comparison unit 71. The numeral "8" is compared with the numeral 5" previously buffered in the first comparison unit 71. The larger numeral "8" is swapped to the above. The numeral "9" in the second comparison unit 72 is compared with the maximum which is filled in the register where the previous value "8" is shifted out. The smaller numeral "9" is buffered in the lower register of the second comparison unit 72.

FIG. 8(c) shows the numeral "5" previously in the lower register of the first comparison unit 72 is outputted. The numeral "9" in the second comparison unit 72 is shifted to the register where the numeral "5" is buffered. The numeral "9" is compared with the numeral "8", and the smaller numeral "8" is placed in the lower register of the first comparison unit 71.

In FIG. 8(d), the numeral "8" is outputted, and the numeral "9" is compared with the default maximum. The numeral "9" is swapped to the lower register in the first comparison unit 71.

At last, as shown in FIG. 8(e), the last numeral "9" which is also the largest of the input numerals is outputted.

As the example described in FIG. 7 and FIG. 8, the sequential input numerals "2, 3, 5, 8, 9" are sorted and outputted in order from small to large. In the example, the upper registers at row are linked with the input end, and allow the numerals to be input sequentially. In the input or output process, the values buffered in the upper registers are orderly shifted at the same row. After the comparison operation performed in the every comparison unit, the upper register stores the larger value and the lower register is for smaller value. The numeral at the lower register is firstly outputted via the output end. The shifting operation is also applied between the lower registers at the same row, and the value can be filled by the value in the adjacent register when the buffered value is outputted. The lower registers store the smaller values after the comparison operation made by the every comparison unit.

Figure 9:
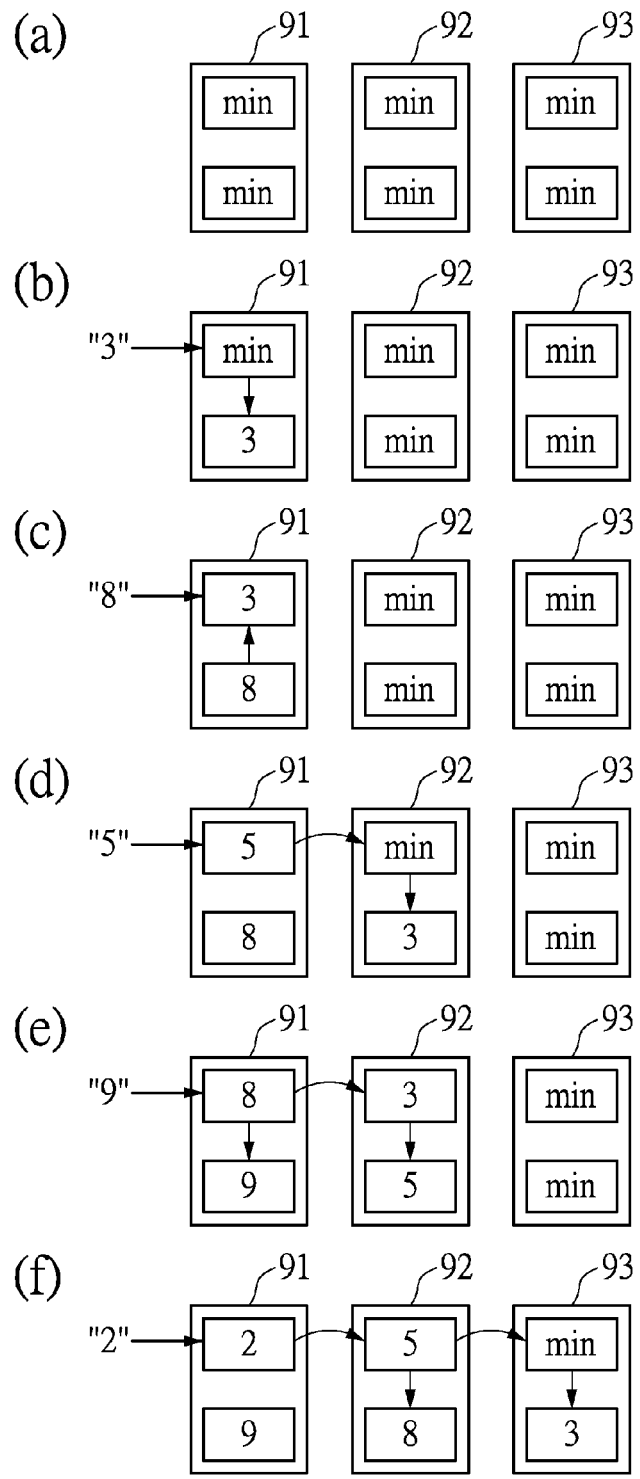
FIG. 9 schematically shows another embodiment performing the sorting in accordance with the present invention.
Figure 10:
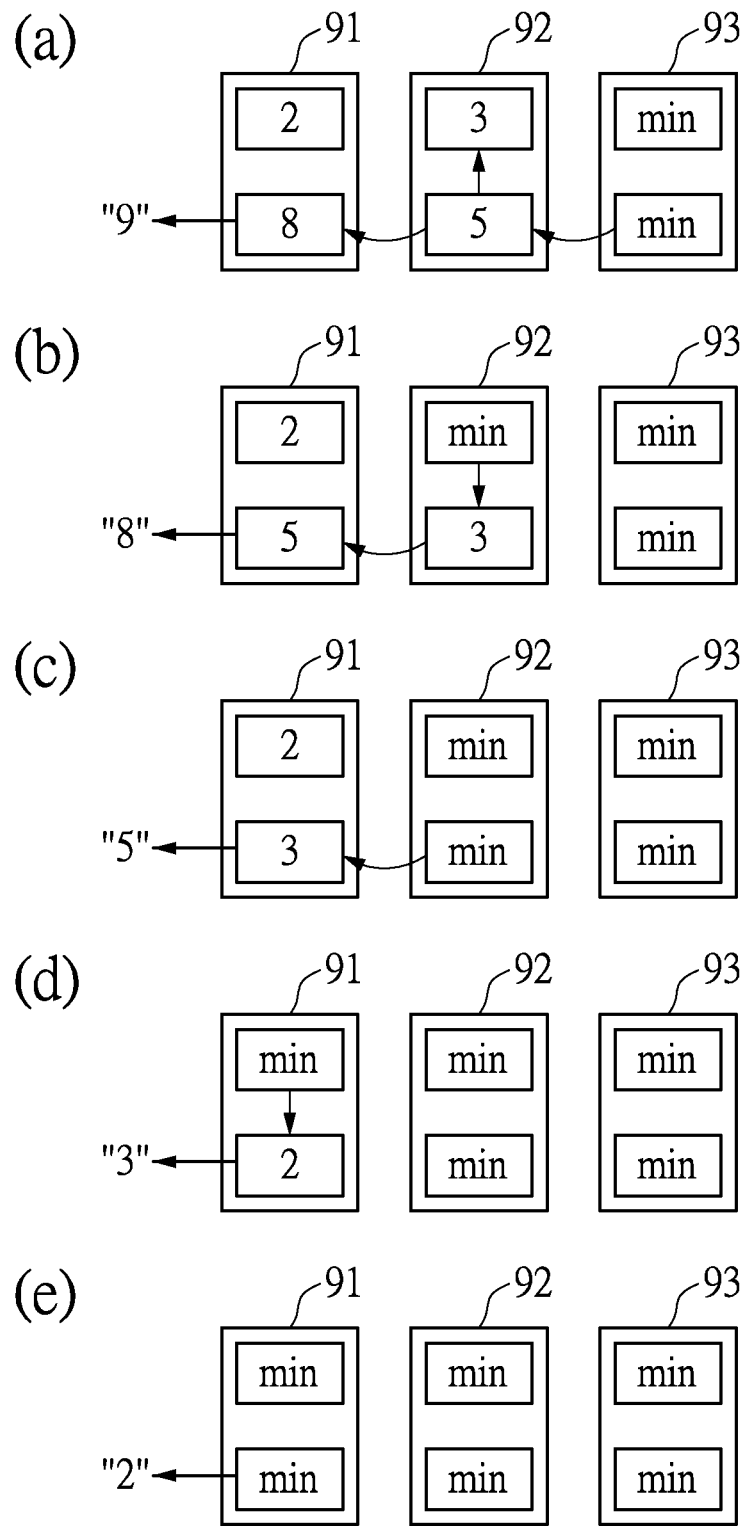
FIG. 10 schematically shows one further embodiment performing the sorting in accordance with the present invention.

FIG. 9 and FIG. 10 schematically show the further example made by the method for sorting of the present invention.

The sorting device exemplarily shown in FIG. 9(a) includes a first comparison unit 91, a second comparison unit 92, and a third comparison unit 93. In the present example, the initial values of all registers are set as minimum. Rather than the example described in FIG. 7 and FIG. 8, the larger value is buffered in the lower register, and the smaller value is in the above register; however the same values will not need to change the positions.

A first numeral "3" is inputted to a first comparison unit 912 of the sorting device at a next cycle, reference is made to FIG. 9(b). This numeral "3" is compared with the default value in the register of the first comparison unit 91. The default value in every register in accordance with the present example is a minimum. The larger value such as the input "3" is temporarily buffered in the lower register after the comparison and a swapping operation.

FIG. 9(c) shows a numeral "8" is inputted to the sorting device at the subsequent timing cycle. This numeral "8" is compared with the previously-inputted "3" in the first comparison unit 91. The larger numeral "8" is swapped to the lower register of the first comparison unit 91 after the comparison is made.

At the next cycle, the numeral "5" is inputted as shown in FIG. 9(d). The numeral "3" previously buffered in the upper register of the first comparison unit 91 is shifted to the adjacent register in the second comparison unit 92 while the numeral "5" is inputted. The numeral "3" is compared with the default minimum of the other register in the second comparison unit 92. The larger numeral "3" is then swapped to the lower register. In the meantime, the input numeral "5" is compared with the previously-buffered numeral 8 in the first comparison unit 91. The larger numeral "8" is in the lower register.

FIG. 9(e) shows the next numeral "9" is inputted to the first comparison unit 91. The numeral "5" in the upper register of the first comparison unit 91 is shifted to the register in the second comparison unit 92, and compared with the numeral "3". The larger numeral "5" is swapped to the lower register. The current input numeral "9" is compared with the numeral "8" previously-buffered in the first comparison unit 91. Similarly, the larger numeral "9" is at the lower register.

The last numeral "2" is afterwards inputted in the sorting task, reference is made to FIG. 9(f). The input value "2" is obviously smaller than the numeral "9" stayed in the first comparison unit. The larger numeral "9" is at the lower register. At this moment, the numeral "8" is shifted to the second comparison unit 92 while the "2" is inputted. The numeral "8" is compared with the numeral "5" in the second comparison unit 92. The larger numeral "8" is buffered in the lower register. Also, the numeral "3" previously stayed in the upper register of the second comparison unit 92 is shifted to the next register of the third comparison unit 93 while the numeral "8" is shifted in. The numeral "3" is then compared with the default minimum in the same comparison unit. The larger "3" is at the lower register.

The above-mentioned input numerals are input sequentially to the sorting device according to the timing cycle. The numerals are processed by shifting operation, comparison and swapping in or between the comparison units if necessary. FIG. 9(f) shows the final state of the sorting device under the input mode.

Following the state shown in FIG. 9(f), reference is made to FIG. 10 depicting a step-by-step in output procedure.

FIG. 10(a) shows an output end disposed to link to the lower register of the first comparison unit 91. Therefore the value may be directly outputted from this register via this output end, especially the largest numeral "9" according to the present example. In the same timing cycle, the numeral "8" in the lower register of the second comparison unit 92 next to the first comparison unit 91 is shifted to the lower register of the first comparison unit 91. The numeral "8" is then compared with the numeral "2" buffered in the upper register in the same comparison unit (91). The larger numeral "8" is stayed in the lower register. Further, the numeral "3" buffered in the lower register of the third comparison unit 93 is shifted to the register in the second comparison unit 92, and also compared with the numeral "5" in the same comparison unit (92). The larger numeral "5" is finally stayed in the lower register.

FIG. 10(b) shows outputting the numeral "8" at next cycle. In the meantime, the numeral "5" in the lower register of the second comparison unit 92 is shifted to the lower register where the numeral "8" stays of the first comparison unit 91. The larger numeral "5" stays in the lower register after comparison made between the numerals "5" and "2". The numeral "3" stayed in the second comparison unit 92 is compared with the default minimum value. The larger numeral "3" is therefore stayed in the lower register.

In FIG. 10(c), the numeral "5" is outputted. The numeral "3" in the lower register of the second comparison unit 92 is shifted to the first comparison unit 91 and buffered in the lower register is compared with the numeral "2".

FIG. 10(d) shows the step of outputting the numeral "3". The remaining numeral "2" is therefore swapped to the lower register of the first comparison unit 91 as compared with the initial value, the minimum. FIG. 10(e) shows outputting the last numeral "2". This numeral "2" is the smallest value of the numerals to be sorted in this sorting task, that sequentially outputs the numerals "9, 8, 5, 3, 2" in the order from large to small.

To sum up the above description, the method for sorting in accordance with the present invention and the sorting device are provided to perform the sorting operation without or with low timing latency. It is featured that the plurality of serially-connected comparison units constituting the reconfigurable sorting device performs the sorting operation including the shifting operation, comparison, and swapping. However, the sorting device needs not too much computation and hardware capability. The device also meets the requirement of low timing latency. Further, the sorting device is reconfigured to perform different sorting tasks by separate sorting groups. The invention substantially advantages the hardware adopting the claimed sorting device to have high efficiency, cost reduction, and simplifying the hardware structure.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A method for sorting with re-configurability, adapted to a reconfigurable sorting device having a plurality of serially-connected comparison units, wherein all or part of the comparison unit of the sorting device join the storing task, each comparison unit includes two registers for buffering numerals to be sorted, before entering an input mode, the sorting device allocates a sorter group based on the number of numerals to be sorted, the sorter group joining the sorting task includes a plurality of comparison units corresponding to the number of the numerals to be sorted, and wherein the sorting device allocates one or more sorter groups according to the sorting task and the every sorter group is configured to have its own input end and output end, the method comprising:

entering the input mode, comprising:

(1) setting initial values of the registers in the plurality of comparison units as a maximum or a minimum, and the sorting device includes an input end and an output end;

(2) sequentially inputting a plurality of numerals to be sorted via the input end;

(3) buffering the input numerals via the input end to a register of a first comparison unit of the serially-connected comparison units; in which an original value in the register for buffering the input numerals is shifted to the register in another comparison unit;

(4) comparing numerals buffered in the registers when the numeral in every register of every comparison unit is changed; then determining the numeral stayed in every register of every comparison unit according to the comparison;

(5) repeating the steps (2), (3), and (4) until the numerals are completely inputted; entering an output mode, comprising:

(6) sequentially outputting the numerals buffered in the registers of the first comparison unit via the output end;

(7) comparing the numerals buffered in the register in a next comparison unit next to the first comparison unit, and shifting one of the numerals-to the register where the buffered numeral is outputted according to the comparison;

(8) comparing numerals buffered in the registers when the numeral in every register of every comparison unit is changed; determining the numeral stayed in the every register of every comparison unit according to the comparison;

(9) repeating the steps (6), (7), and (8) until all the numerals are outputted.

2. The method according to claim 1, wherein the initial values of the registers of the plurality of comparison units are set as the maximum when the numerals to be sorted are configured to be outputted from small to large.

3. The method according to claim 1, wherein the initial values of the registers of the plurality of comparison units are set as the minimum when the numerals to be sorted are configured to be outputted from large to small.

4. The method according to claim 1, wherein the step of inputting the numerals is based on a timing signal of the sorting device; a control unit is configured to switch the input mode and the output mode according to the timing signal when the numerals are completely inputted or outputted.

5. A sorting device performing the method for sorting with re-configurability according to claim 1, comprising:

the plurality of serially-connected comparison units, wherein the every comparison unit includes two registers, and the sorting device is reconfigurable;

a control unit, electrically connected with the plurality of serially-connected comparison units, used to control the comparison units entering the input mode or the output mode;

wherein, the serially-connected comparison units are reconfigured to constitute one or more sorter groups, and the every sorter group is configured to have its own input end and output end.

6. The sorting device according to claim 5, wherein the every sorter group is connected with the control unit, and the control unit individually controls operation of the every sorter group.

7. The sorting device according to claim 5, wherein the every comparison unit comprises:

a comparator used to perform numeral comparison; and two multiplexers used to determine the numerals stayed in the every register according to comparison result made by the comparator.

\* \* \* \* \*